J. B. CLAPPER.
APPARATUS FOR ELECTRIC WELDING.
APPLICATION FILED OCT. 18, 1916.
1,270,786.
Patented July 2, 1918.
2 SHEETS—SHEET 1.
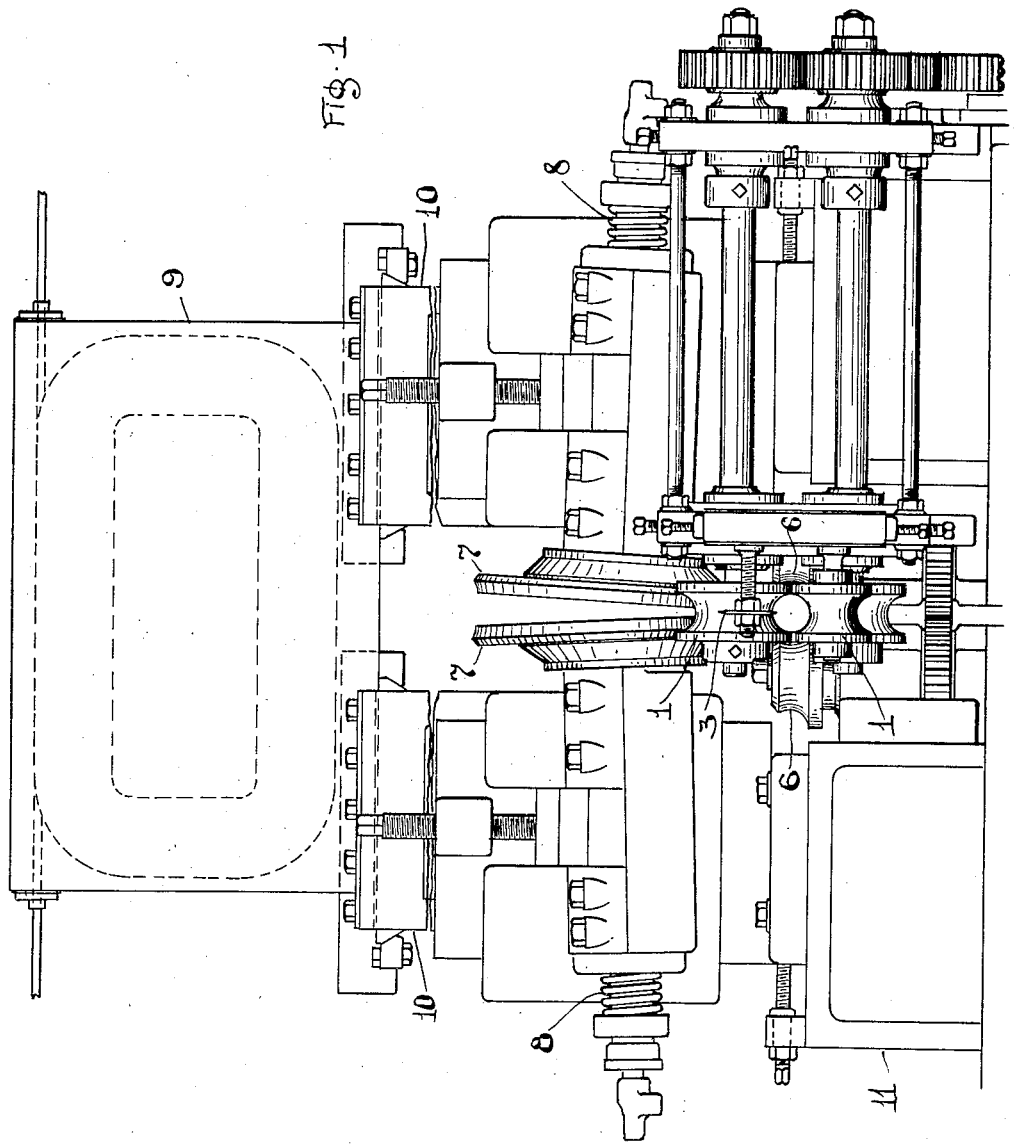
INVENTOR
Joseph B. Clapper
BY Jay. Oberlin & Jay
ATTORNEYS

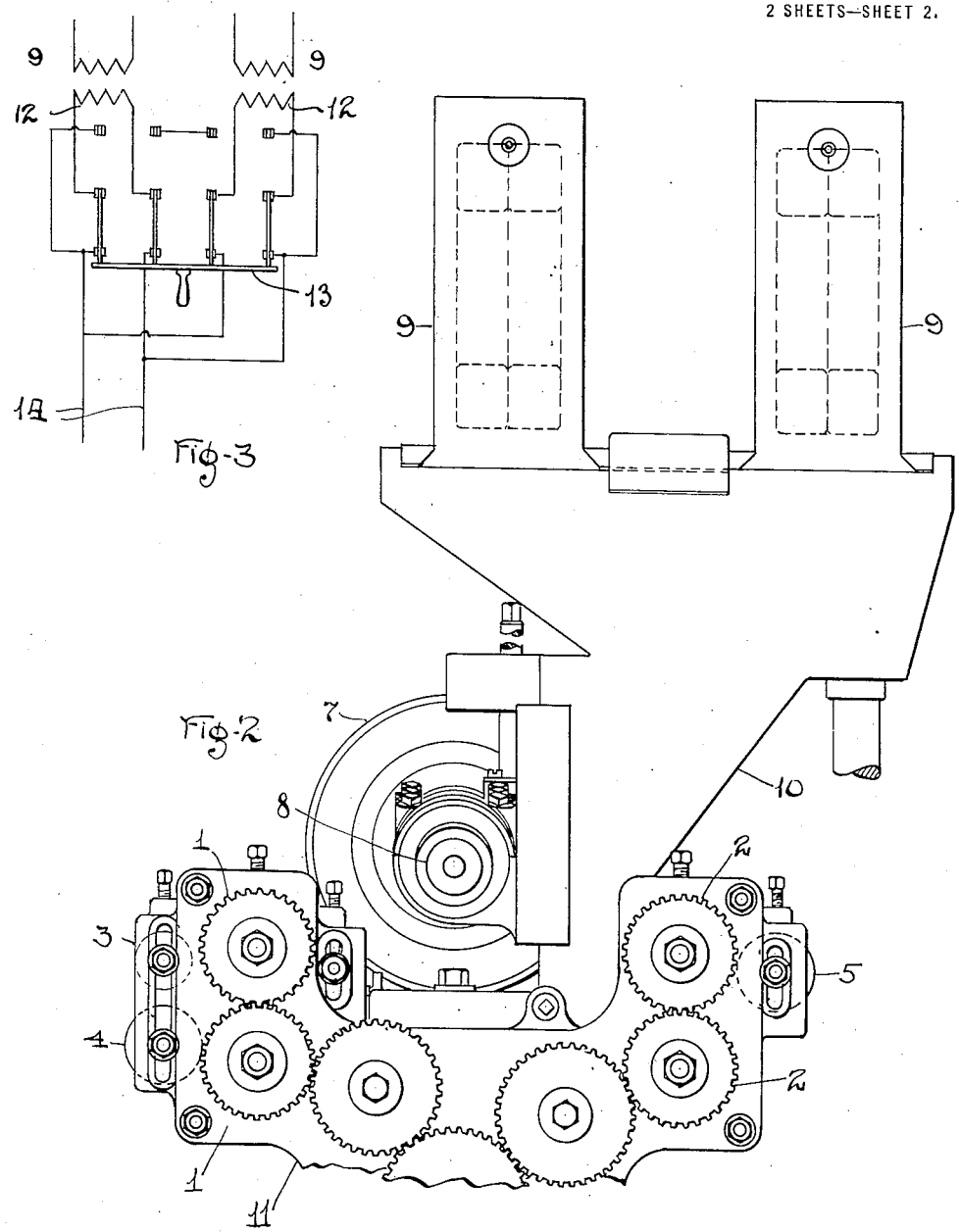

UNITED STATES PATENT OFFICE.

JOSEPH B. CLAPPER, OF LAKEWOOD, OHIO, ASSIGNOR, BY MESNE ASSIGNMENTS, TO THE STANDARD PARTS COMPANY, OF CLEVELAND, OHIO, A CORPORATION OF OHIO.

APPARATUS FOR ELECTRIC WELDING.

1,270,786.   Specification of Letters Patent.   Patented July 2, 1918.

Application filed October 18, 1916. Serial No. 126,316.

*To all whom it may concern:*

Be it known that I, JOSEPH B. CLAPPER, a citizen of the United States, and a resident of Lakewood, county of Cuyahoga, and State of Ohio, have invented a new and useful Improvement in Apparatus for Electric Welding, of which the following is a specification, the principle of the invention being herein explained and the best mode in which I have contemplated applying that principle, so as to distinguish it from other inventions.

The present improvements, relating as indicated to electric welding machines, have regard more particularly to tube welding machines of the kind described and claimed in United States Letters Patent No. 658,741 to Otto Parpart, dated September 25, 1900, wherein rolls are provided for forcing the abutting edges of the tube together by compression, while a welding electric current is simultaneously passed across the joint between such edges by directly pressing suitable electrodes, or electric current-conducting devices, along the opposite edges. The electrodes just referred to, preferably take the form of rolls, having contact edges that conform with the tube being welded, and suitably connected with a source of current. It will be understood, however, that the principle of the invention in hand may be utilized with other mechanism arranged for operating on different articles so long as the general character of the process is the same.

In apparatus of the sort described, it is of course necessary to use a current of relatively low voltage and corresponding high amperage compared with that of the ordinary commercial circuit, and a feature of the apparatus, accordingly, is the transformer, which is usually assembled directly on the welding machine in order that the leads from the transformer secondaries to the electrodes may be as short as possible. Obviously the capacity of the transformer determines the maximum output of the machine per unit of time, as also the maximum cross-section of metal that can be welded at the voltage impressed on the welding machine contacts, this voltage being non-adjustable except with loss of electric power, by the insertion of a resistance in the primary circuit of the transformer. In other words, in order to adapt such machine of current type of construction to the welding of cross-sections of metal smaller than the maximum, which requires the full voltage and capacity of the transformer, the excess voltage and capacity must be disposed through ohmic resistance, thus entailing a loss of electrical power and reducing the operating efficiency of the machine. It has, accordingly, become necessary, in order to operate economically, to have a specially designed machine for each gage of stock being welded, and this being possible only in the case of quantity production, the range of usefulness of welding apparatus of this sort has been considerably curtailed.

The object of the present invention is to provide a plurality of transformers in connection with each individual machine, which transformers are arranged to have their primary coils variously connected together, *e. g.*, in multiple or series, or series-multiple, across the power-supply-line voltage. In this way a relatively wide range in the voltages, which can be impressed on the welding contacts of the machine, may be secured by the simple manipulation of suitable switches involving no dissipation of current, or decrease in operating efficiency. One and the same apparatus is accordingly adapted for operation on a variety of gages of stock, and such apparatus accordingly rendered much more generally adaptable.

To the accomplishment of the foregoing and related ends, the invention, then, consists of the steps and means hereinafter fully described and particularly pointed out in the claim, the annexed drawings and the following description setting forth in detail certain steps and mechanism embodying the invention, such disclosed means constituting, however, but one of various ways in which the principle of the invention may be used.

In said annexed drawings:—

Figure 1 is a front elevational view of the upper portion of an electric welding machine embodying my present improvements; Fig. 2 is a side elevation of the same, viewed from the right in Fig. 1; and Fig. 3 is a diagrammatic view of the electrical connections for the transformer primaries.

As previously indicated, the mechanism in hand is designed primarily for welding tubes, which are preliminarily formed out of metal strips, or skelp, so as to bring their longitudinal edges into abutting relation. Suitable paired feed rolls 1, 1 and 2, 2, are accordingly provided for passing such preliminarily formed tubing through the machine, these being suitably intergeared and driven from a power-shaft, not shown. In addition, guide rolls 3, 4 and 5 are provided to supplement the action of such feed rolls, such guide rolls 3 including a disk with a sharp edge which rides in the groove between the abutting edges of the tube, and so holds the tube in proper angular position about its axis. There are also provided two pressure rolls 6, 6 (see Fig. 1), adapted to bear laterally against the tubing and force the edges thereof together.

Between the respective pairs of feed rolls 1, 1 and 2, 2, proper, are mounted two disk-like rolls 7, 7 which constitute the electrodes. The detailed construction and mounting of these rolls is not of interest in the present connection, it being sufficient to state that the axes of their supporting spindles 8, 8, are inclined as indicated in Fig. 1, and that their edges are formed so as to contact closely with the portions of the tube adjacent each side of the seam. These electrodes are connected through the frame of the machine with the secondaries of the transformers 9, 9, of which two are employed instead of one, as heretofore in apparatus of the sort in hand. It will be understood that more than two such transformers may be employed if a still greater range of voltage, or flexibility in operation is desired.

These transformers 9, 9 are preferably mounted side by side on spaced standards 10, 10, that rise above the main frame 11, of the machine and the operative mechanism directly supported thereon.

It being the method of connecting up the primary coils in these transformers, that constitutes the feature of special interest, such connections have been illustrated in a separate figure, viz., Fig. 3, from which it will be seen that the primary coil 12 of each transformer has its terminals connected to the terminals of a switch 13 of the double throw, multiple point type, having the proper number of poles, whereby the aforesaid transformer primary coils may be connected in multiple or series, across the power-supply-line leads 14. It will be understood that instead of having two entirely separate transformers a plurality of primary coils or a plurality of sections of one or more coils may be utilized in one terminal, such coils or sections being arranged to be connected across the power-supply-line voltage by means of a switch of the character described, whereby such coils or sections may be placed in multiple, series, or series-multiple connection, as desired.

Obviously, in each of the several arrangements of the primary coils, whether of a plurality of separate transformers, or of a group of primary coils in a single transformer, the voltage impressed on the welding machine contacts is adjustable between the limits determined by the number of such transformers, or transformer primary coils. Accordingly instead of being able to operate efficiently on but one cross-section or gage of stock, a number of different sizes may be handled with but a single piece of apparatus, thus rendering it possible to economically produce by the method of electric welding in hand, articles in limited quantities, since the apparatus can be readily shifted from operation on one class of such articles to another.

Since obviously, as indicated above, a plurality of primary coils, or a plurality of sections of one or more coils, may be utilized instead of a plurality of entirely separate transformers, it will be understood that the phrase, plural primary transformer coils, as employed in the following claim, refers to such whether forming parts of separate transformers or of one transformer or sections of what might otherwise be considered a single primary coil.

Other modes of applying the principle of my invention may be employed instead of the one explained, change being made as regards the steps or mechanism herein disclosed, provided the means stated by the following claim or the equivalent of such stated means be employed.

I therefore particularly point out and distinctly claim as my invention:—

In apparatus of the character described, the combination of welding electrodes adapted to contact with parts to be welded together, respectively; two transformers each having a secondary and a primary coil, such secondary coils being connected with said electrodes; and switch means adapted to connect such two primary coils of said transformers in paralled or in series, substantially as described.

Signed by me, this 14 day of October, 1916.

JOSEPH B. CLAPPER.

Attested by—
  C. W. GRESSLE,
  J. W. HOLT.